United States Patent [19]
Wentworth

[11] 3,860,567
[45] Jan. 14, 1975

[54] EPOXIDE AND POLYHYDROXYL-CONTAINING ACRYLIC FIBER

[75] Inventor: Gary Wentworth, Raleigh, N.C.

[73] Assignee: Monsanto Company, St. Louis, Mo.

[22] Filed: June 23, 1972

[21] Appl. No.: 272,903

Related U.S. Application Data

[62] Division of Ser. No. 131,468, April 5, 1971.

[52] U.S. Cl. 260/80.72, 260/29.1 R, 260/30.8 DS, 260/32.2 N, 260/32.6, 260/63 N, 260/80.76, 260/80.8, 260/85.5 B, 260/85.5 ZA, 260/85.5 S, 264/182
[51] Int. Cl. C08f 15/02, C08f 27/00
[58] Field of Search 260/80.72, 85.5 R, 85.5 ZA, 260/85.5 B, 85.5 S, 88.3 A

[56] References Cited
UNITED STATES PATENTS

| | | | |
|---|---|---|---|
| 2,933,460 | 4/1960 | Richter et al. | 260/2.1 |
| 3,140,265 | 7/1964 | Richter et al. | 264/182 |
| 3,180,845 | 4/1965 | Knudsen et al. | 264/182 |
| 3,505,445 | 4/1970 | Leonard et al. | 264/182 |

OTHER PUBLICATIONS

Roberts et al., Basic Principles of Organic Chemistry, W. A. Benjamin, Inc., New York (1965), p. 415.
Kazuya et al., Chem. Abs., 73, (1970), 46603j.

*Primary Examiner*—Harry Wong, Jr.
*Attorney, Agent, or Firm*—Robert L. Broad, Jr.

[57] ABSTRACT

An acrylic fiber made from a composition comprising acrylonitrile and an epoxide-containing vinyl monomer is herein described wherein the epoxide portion of said monomer is pendant to the polymer chain and thereafter reacted with a polyhydroxyl compound to produce an improved filamentary material. The fiber is made from a polymer which is made by forming an epoxide containing polymer of acrylonitrile and allowing the polymer to undergo an acid catalyzed reaction in a spin bath containing a polyhydroxyl compound such as polyethylene glycol. The novel compositions herein described have enhanced properties.

2 Claims, No Drawings

EPOXIDE AND POLYHYDROXYL-CONTAINING ACRYLIC FIBER

This is a division of copending application, Ser. No. 131,468, filed Apr. 5, 1971.

BACKGROUND OF THE INVENTION a. Field of the Invention

This invention relates fibers made from modified polymers of acrylonitrile. More particularly, this invention relates to acrylic fiber having enhanced physical properties, especially an improved hand.

b. Description of the Prior Art

Compositions of acrylonitrile and copolymers of 80 or more percent by weight of acrylonitrile and up to about 20 weight percent of a comonomer are conventionally fabricated into fabrics and films. The conventional technique for preparing synthetic fibers from acrylonitrile polymers involves the dissolution of the polymer in a suitable organic solvent and thereafter extruding the solution through a spinneret containing a plurality of orifices, into a medium which removes the organic solvent from the solution and coagulates the polymers in a continuous form. The coagulated forms may be then washed, dried and stretched to orient the polymer molecules.

Filaments and fibers produced in accordance with the prior art procedures have often not possessed all the physical properties desired. It is often the case that most of the filaments and fibers are lacking in some physical property and do not possess the necessary qualities to be employed satisfactorily in certain end uses. Many properties are difficult to describe with precision. In the end product a number of properties are usually considered immediately in assessment thereof and this is often done subjectively in handling and examining such products. Thus, such properties as luster, appearance, smoothness or roughness, softness or limpness and good or poor drape are noted at once. Hand relates to the feel of particular material and embraces firmness, elasticity, fineness, softness and resiliency. It is generally considered that fabric stiffness is an essential quality in hand.

A problem with respect to acrylonitrile filaments and fibers thereof is the lack of softness and the required flexibility in the finished product. Attempts have been made with varying degrees of success to influence the character of acrylic polymers through the use of various mono-olefinic monomers copolymerizable acrylonitrile. Also, attempts to modify the physical and chemical characteristics of acrylic polymers have been made via admixing different polymeric substances therewith. Further, attempts to modify certain undesirable characteristics have been made by treating the exterior surfaces of the fiber with different organic and inorganic agents and conditioners. A particular limitation with respect to several types of these techniques is in dissipation and removal of such modification over a period of time incommensurate with the useful life of such filaments and fibers wherein the desired properties are lost completely. Accordingly, there is a need for other means which offers enhanced and permanent resistance to changes in fiber tactile properties. Although the shaped articles of copolymers comprising acrylonitrile may be treated in accordance with this invention for modification of their properties and especially with respect to tactile properties thereof, the process is of special advantage in the treatment of fibers to render them more amendable to textile processing.

SUMMARY OF THE INVENTION

A principal object of this invention is the provision of new filamentary materials, particularly textile articles made from acrylic polymers. Another object of the subject invention is the provision of acrylic fibers having improved hand. Another object of this invention is to provide a chemical modification of an acrylic filament during wet spinning. Further objects and advantages of the invention will be obvious from the following description.

It has been found that novel acrylonitrile polymers may be prepared by polymerizing monomers comprising acrylonitrile and an epoxide-containing vinyl monomer in the presence of an initiator, isolating the polymer, dissolving the polymer in a solvent to form a dope, and extruding the dope to form filaments in a bath containing a polyhydroxyl compound and an activating amount of a catalyst.

A particular feature of the present invention is that essentially permanent modifications of the fiber properties are attained by reacting after extrusion the formed copolymer with the spinning solution. As a result, the invention yields the advantage of a rapid and rather straightforward approach with an accompanying decreased cost of production.

In producing the novel compositions herein described it is preferable to copolymerize with acrylonitrile from about 4 to about 15 percent by weight of polymer of an epoxide-containing vinyl monomer. The epoxide-containing vinyl monomer contempleted herein may be represented by the general formula:

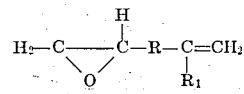

wherein R is a divalent radical of from 1 to about 5 carbon atoms $-CH_2-O-$, $-CH_2OCO-$ or $-CH_2-O-CH_2-$, and $R_1$ is hydrogen or methyl.

It has been further found that novel compositions produced according to the subject invention are in themselves most useful. The compositions are formed from a copolymer comprising about 85 percent by weight acrylonitrile, and from about 4 to about 15 percent by weight of an epoxide-containing vinyl monomer, the epoxide portion thereof being pendant to the copolymer chain, and a polyhydroxyl compound chemically bonded to said epoxide portion, the polyhydroxyl-copolymer being represented by the general formula:

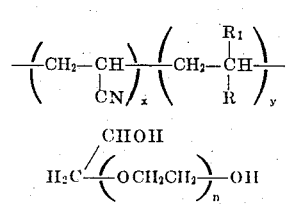

wherein R is a divalent radical of from 1 to about 5 carbon atoms, $CH_2OCO-$, $-CH_2-O-$, or $-CH_2-O-CH_2-$, and $R_1$ is hydrogen or methyl, $n$ having a value of at least about 9, and the sum of $x$ and $y$ having a value greater than 50.

The shaped filamentary article or articles of this invention comprise the aforementioned composition, said article being further characterized by having substantially all of said polyhydroxyl compound chemically bonded within the interior of said filamentary article and substantially no polyhydroxyl compound on the surface of said article.

The epoxide-containing vinyl monomers denoted herein may be represented by the general formula:

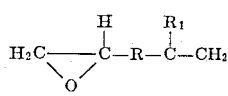

wherein R is a divalent radical of from 1 to about 5 carbon atoms, $-CH_2O-$, $-CH_2OCO-$, or $-CH_2-O-CH_2-$, and $R_1$ is hydrogen or methyl. A number of said monomers such as glycidyl acrylate, allyl glycidyl ether, methallyl glycidyl ether are commercially available. In particular, a variety of monoglycidal ethers containing vinyl unsaturation are available. The epoxide-containing vinyl monomers may be readily synthesized by conventional organic preparations. It is known that such monomers may be conveniently prepared in usually excellent yields by conversion of alkenes to epoxides through the use of organic peracids such as perbenzoic or monoperphthalic acids in dioxane. In addition, such monomers may be synthesized by employing peracetic acid in acetic acid solution for the oxidation of alkenes to epoxides or resort may be had to 30 percent hydrogen peroxide additions to a solution of the alkenes in formic acid to effect the epoxidation of unsaturation.

The polymerization reaction may be initiated by means of any free radical-producing initiator. Suitable initiators include the water-soluble peroxy compounds, for example, hydrogen peroxide, sodium peroxide, sodium perborate, sodium persulfate and other alkali metal salts of peroxy acids, or other water-soluble peroxy compounds. Also initiators, such as azo-2,2'-diisobutyronitrile may be used advantageously in the polymerization. A wide variation in concentration of initiators may be used depending on the temperature of polymerization, the concentration of monomers in the reaction mass, and the molecular weight desired of the polymeric materials. From about 0.1 to 5.0 percent by weight, based on the monomer, of initiator may be used. The initiator may be charged at the outset of the reaction, or it may be added continuously, or in increments, throughout the reaction for the purpose of maintaining a more uniform concentration of initiator in the reaction mass. The latter method is preferred because it tends to make the resultant polymer more uniform in its chemical and physical properties. In general, it is desirable to have a uniform reaction rate and therefore a substantially uniform concentration of the initiator is desired throughout the polymerization. Again, the useful polymers are those of 80 to about 98 percent of acrylonitrile and from four to about 15 percent the epoxide-containing vinyl monomer. It may be worth mentioning that since glycidyl ethers may hydrolyze when present in large proportions in the polymerization reaction vessel, the copolymers of from two to about 10 percent have been found to be most useful. The quantity of the such comonomers present in the polymerized form in the acrylonitrile polymer must necessarily be relatively small, since generally at least 80 percent of acrylonitrile is required to produce fibers with desirable tensile properties, and at least 4 percent of the epoxide-containing vinyl monomer is required. According, interpolymers of up to about 18 percent of the unsaturated monomers, or mixtures of said monomers, are useful.

If it is desired to use additions or other agents, such as dyes, anti-static agents, lubricants, optical brighteners, delusterants, heat and light stabilizers, plasticizers and the like in the copolymeric solutions, they may be incorporated therein without danger of seriously affecting the general properties of the end product. Thus, although a uniform distribution of reactants throughout the reaction mass may be readily achieved by vigorous agitation, it may be generally desirable to promote the uniform distribution of reagents by using wetting agents, or emulsion stabilizers. Further, the amount of such agents depends upon the particular agent selected, the ratio of monomer to solvent, and the conditions of polymerization. It may be stated that rotary stirring devices are generally the most effective means of insuring the intimate contact of the reagents, but other means may be successfully employed, for example, rocking or tumbling the reactor or polymerization vessel.

The optimum polymerization for fiber formation often involve the use of polymerization regulators to prevent formation of polymer units of excessive molecular weight. Suitable regulator which may be used in this invention are the alkyl and aryl mercaptans, carbon tetrachloride, chloroform, dithioglycidol and phenols. The regulators when employed may be used in amounts varying from 0.001 to about two percent of the weight of the monomers to be polymerized.

Monomers that may be polymerizable with acrylonitrile and epoxide-containing vinyl monomer are the monoolefinically unsaturated monomers and are exemplified by compounds such as methyl acrylate, ethyl acrylate, butyl acrylate, methoxy methyl acrylate, methyl methacrylate, vinyl bromide, methacrylonitrile, acrylamide, methacrylamide, methyl vinyl ketone, vinyl acetate, styrene, 2-methyl-5-vinylpridine, vinylidene chloride and other vinyl monomers known to those skilled in the art.

The polymers may be prepared by solution copolymerization in suitable organic solvents, such as dimethyl sulfoxide. Further, the polymers of this invention may be prepared at pH 5-8 using bulk, suspension or aqueous emulsion techniques generally known in the art of vinyl polymerization. Polymerization may be carried out by continuous, semi-continuous and batch polymerization techniques.

The polymeric material is, after polymerization, separated or isolated by filtration or other means well-known in the art. The isolated polymer may thereafter be washed and dried. The resulting polymer may require washing operations to remove traces of soluble catalyst or dispersing agents.

The isolated polymer which is generally in a solid granular state may be dissolved to form a spinning solution or dope in conventional organic solvents such as dimethylacetamide, dimethylformamide, dimethylsulfoxide, ethylene carbonate and gammabutyrolactone.

The polymeric solution or dope is then extruded to form filaments by wet spinning methods. Fibers of the compositions herein are produced by extruding the polymer solution through a spinneret or die having a plurality of orifices, into a medium to be hereinafter disclosed, the medium causing the polymer to precipitate into a continuous linear form. The volume of solution that passes through a spinneret in a given time should be constant in order to produce a fiber of uniform size. It is also advantageous to pass the solution, which has usually been prefiltered, through one or more additional filters before passing through the spinneret in order to remove any last traces of foreign matter and particles of incompletely dissolved polymer. It should be mentioned that the extruding operation should be operated at elevated temperatures, but well below the boiling point of the solvent employed to form the dope.

Heretofore, the various spin bath compositions utilized have usually been relatively unreactive with acrylic polymers, the spin bath merely removing the solvent from the fibers. In this invention the spin bath contains a polyhydroxyl compound under such conditions that it reacts with the fibers. The polyhydroxyl compounds may be denoted by the following general formula:

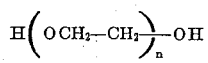

wherein $n$ is a integer of from 8 to 35.

Examples of polyalkylene glycol compounds included within the scope of the aforenoted general formula and which are suitable for the purpose of the present inventions include the condensation products of ethylene oxide with water or alcohols, viz., polyethylene glycol and such compounds as polypropylene and polybutylene glycols and the monoalkyl ethers of the above polyalkylene glycols.

The polymeric material of the instant invention consists essentially of polymeric chains derived from at least two polymerizable monomers, one of which being acrylonitrile and the other being an epoxide-containing vinyl monomer. After polymerization the structure of the polymeric chain is such that a number of epoxide groupings are pendant thereto and are chemically attached through an oxygen linkage to the polyhydroxyl compound aforementioned to form a branched chain having one end free. Thus, copolymers of acrylonitrile with a glycidyl vinyl ether when reacted with polyethylene glycol would take the follwoing course:

An unusual and distinctive characteristic of the subject polymeric material is that essentially all of the polyhydroxyl compound is chemically incorporated in the interior of the fiber structure. Analytical and diffusivity studies bear this out. Although not limited to this theory, it is believed that this unexpected characteristic is due in part to diffusion as opposed to an exclusive mechanism of syneresis during the coagulation process.

Suitable catalysts to be used in conjunction with the polyhydroxy compounds include mineral acids as well as organic acids. Illustrative examples include acetic acid, chloroacetic and p-toluenesulfonic acid. The catalyst concentration may be varied without adverse effects; however, amounts ranging from 0.001 to 0.10 percent by weight may be advantageously employed.

Preferably, the amount of the polyhydroxy compound in the spinning bath may be between about 70 to 100 percent by weight. A number of organic substances may be used in conjunction with the polyhydroxy compound. Solvents which may be used include dimethylformamide, dimethylacetamide and other compatible organics.

The following examples in which parts and percentages are given by weight unless otherwise indicated, illustrate preferred methods of preparing filamentary structures in accordance with the principles of this invention. The invention is not to be limited by the details set forth in the following examples.

EXAMPLE 1

In a 3-liter flask equipped with a reflux condenser and stirrer, 180 of acrylonitrile, 20 of glycidyl acrylate 3.5 of azobis (isobutyronitrile) and 1,000 of dimethyl sulfoxide were combined, resulting in a clear liquid. The solution was subsequently heated to 55° C., for 23 hours and hereafter the viscous material was coagulated in methanol in a Warning blender and isolated by filtration and dried in a vacuum oven. An 81 percent conversion was obtained. The polymer had a specific viscosity, measured in dimethyl formamide at 25° C., 0.1 g/dl, of 0.293. Analysis of the copolymer showed about 87 percent by weight acrylonitrile.

A 15 percent total solids spinning dope of the acrylonitrile-glycidyl acrylate copolymer was intimately mixed in powdered form with a solvent, dimethyl sulfoxide, and warmed until a clear liquid resulted. The resulting spinning dope was cooled to about 50° C., filtered and extruded through a spinneret submerged in a coagulating bath composed of polyethylene glycol having an average molecular weight of 1,500 to which has been added 0.007 weight percent paratouluenesulfonic acid. The temperature of the bath liquid was about 95° C. The filaments so formed were withdrawn from the coagulation bath after a travel therein of about 18 inches and thereafter directed

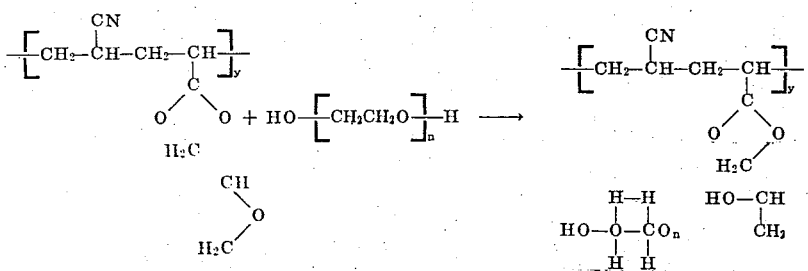

Therefore, after the subject invention it becomes apparent that the different chemical structures of the main and side chain permit novel blending or properties in the ultimate polymer structure.

through a bath of boiling water where a stretch of about 4.0 times was imparted to the filaments. Thereafter, the filaments were dried by passing them around rotating drying rolls maintained at a temperature of about 140°

C. The filaments were cut into two-inch staple and carded. Determinations of fiber properties indicated a tenacity of 3.54 g/denier and an elongation of 33 percent. The hand was very waxy and extremely soft, and was likened to cashmere. The cashmere-like hand of the fiber (carded staple) was retained after several rinsings in distilled water.

A portion of the polymer was dissolved in dimethyl formamide and reprecipitated into methanol in a Warning blender. Analysis of the resulting polymer showed 76 percent by weight acrylonitrile and 11 percent weight chemically bonded polyethylene glycol.

A negative iodine absorption test indicated that no polyethylene glycol was present on the fiber surface. The test was conducted by placing a quantity of elemental iodine in a ten inch glass vacuum disiccator wherein fiber to be tested was supported. No brown iodine-ethoxy ether complex was formed on the surface of the fiber.

EXAMPLE 2

A 22 percent total solids spinning solution of an acrylonitrile-glycidyl vinyl ether copolymer (96/4 weight ratio) in dimethyl sulfoxide was prepared and spun into polyethyene glycol having an average molecular weight of about 1600 to which 0.02 percent by weight para-toluenesulfonic acid was added. A portion of the resulting fiber was dissolved in dimethyl formamide and reprecipitated into menthanol in a Warning blender. Analysis of the polymer indicated about 92 percent by weight acrylonitrile. Infrared spectral analysis shown the presence of polyethylene glycol. Since the original polymer, before spinning, contained 96 percent by weight acrylonitrile, the fiber contained about 4 percent by weight permanently bonded polyethylene glycol. A negative iodine sublimation test was obtained. Fibers of this example had a cashmere-like hand.

I claim:

1. An acrylic filament comprising (A) at least about 85 percent by weight acrylonitrile, (B) from about 4 percent to about 15 percent by weight of an epoxide-containing vinyl monomer copolymerized with the acrylonitrile and represented by the general formula:

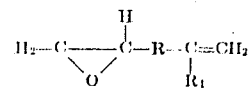

and (C) 4 to 11 percent by weight of a polyglycol having the general formula:

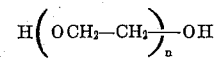

the epoxide portion of the epoxide-containing vinyl monomer being cleaved and the polyglycol chemically bonded to said portion such that the fiber has the general formula:

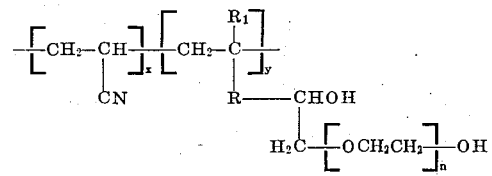

wherein R is a divalent radical of from 1 to about 5 carbon atoms, $-CH_2O-$, $-CH_2OCO-$, or $-CH_2-O-CH_2-$, $R_1$ is hydrogen or methyl, $n$ is an integer of from 8 to 10, and the sum of $x$ and $y$ at least 50.

2. The acrylic filament of claim 1 wherein the polymer includes not over 10 percent, by weight of the polymer, of a vinyl monomer selected from the group consisting of vinyl acetate, vinylidene chloride, vinyl bromide and methyl acrylate incorporated in the polymer chain.

* * * * *

UNITED STATES PATENT OFFICE
CERTIFICATE OF CORRECTION

PATENT NO. : 3,860,567
DATED : Jan. 14, 1975
INVENTOR(S) : Gary Wentworth

It is certified that error appears in the above-identified patent and that said Letters Patent are hereby corrected as shown below:

Col. 1, line 8, after "relates" insert ---to---;

Col. 1, line 49, after "copolymerizable" insert ---with---.

Col. 2, line 2, "amendable" should read ---amenable---.

Col. 5, line 35, "35" should read ---10---;

Col. 5, line 55, "follwoing" should read ---following---.

Col. 6, line 32, after "180" insert ---gram---;

Col. 6, line 33, after "3.5" insert ---gram---;

Col. 6, line 33, after "1,000" insert ---gram---.

Col. 7, line 29, "menthanol" should read ---methanol---.

Col. 7, line 32, "shown" should read ---showed---.

Signed and Sealed this twenty-third Day of December 1975

[SEAL]

Attest:

RUTH C. MASON
*Attesting Officer*

C. MARSHALL DANN
*Commissioner of Patents and Trademarks*